J. WITHERS AND H. G. O'BRIEN.
ROLL DRIVING CONNECTION.
APPLICATION FILED JUNE 3, 1919.
1,336,177.
Patented Apr. 6, 1920.
2 SHEETS—SHEET 2.
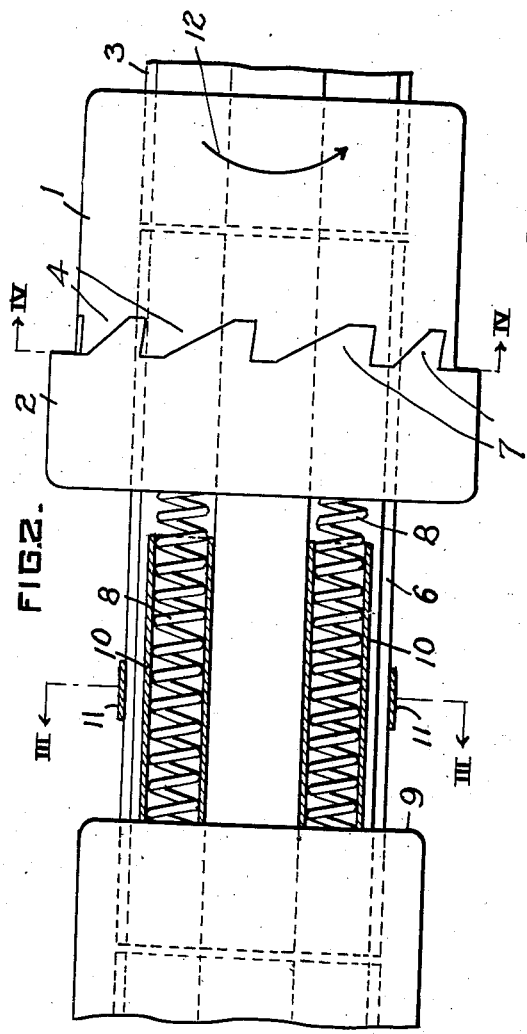
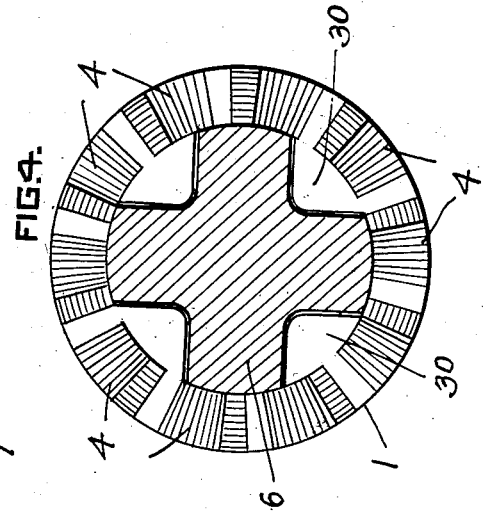
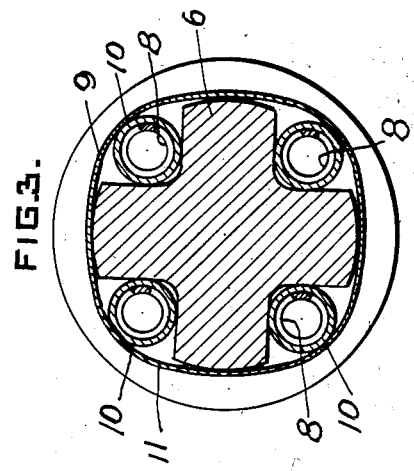
WITNESSES
INVENTOR

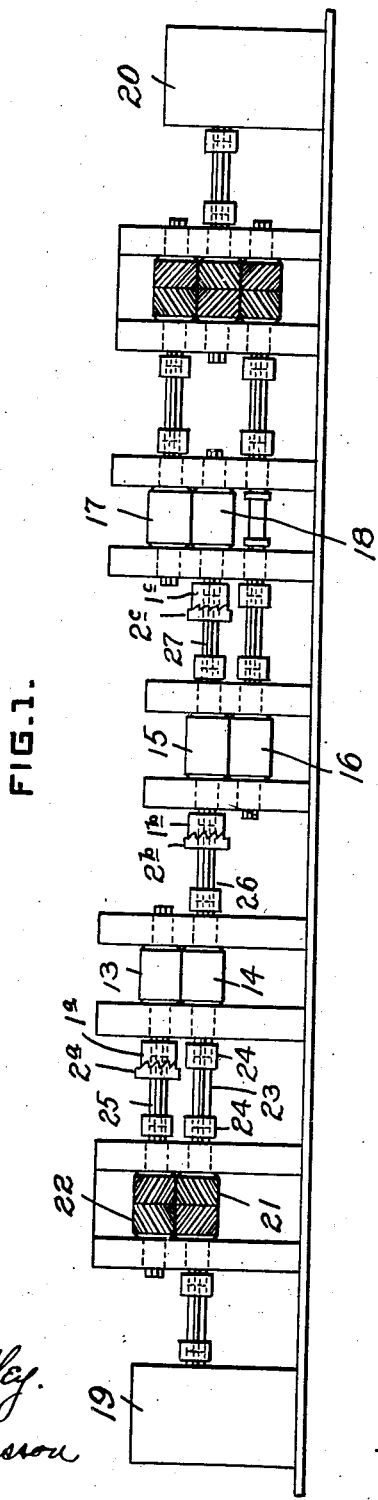

UNITED STATES PATENT OFFICE.

JOSEPH WITHERS AND HENRY G. O'BRIEN, OF WARREN, OHIO.

ROLL-DRIVING CONNECTION.

1,336,177.     Specification of Letters Patent.     Patented Apr. 6, 1920.

Application filed June 3, 1919. Serial No. 301,490.

*To all whom it may concern:*

Be it known that we, JOSEPH WITHERS and HENRY G. O'BRIEN, residing at Warren, in the county of Trumbull and State of Ohio, citizens of the United States, have invented or discovered certain new and useful Improvements in Roll-Driving Connections, of which improvements the following is a specification.

Our invention relates to driving mechanism for rolling mills, and the object thereof is to provide improved connections whereby a roll, which is normally driven frictionally by its companion roll, may be positively driven when its peripheral speed of rotation falls below that of such companion roll.

In the accompanying sheets of drawings which form part of our specification the preferred embodiment of our invention is illustrated. Figure 1 is a side view of a series of sets of rolls and their driving connections; Fig. 2 a side view to enlarged scale of a clutch; Figs. 3 and 4 sectional views taken on the line III—III and IV—IV, Fig. 2.

In rolling mills it is desirable to have one of a pair of coöperating rolls positively driven and the other frictionally driven. Occasionally, due to irregularities in hot metal being rolled, or for other causes, the frictionally driven roll sticks, and before it can again be caused to rotate the hot metal burns the surface of the roll so that it must be removed and redressed. Otherwise the burned spot or spots on the roll face will cause irregularities and blemishes on the surface of the metal being rolled. To overcome this difficulty we provide connections of a practical character for positively driving the friction roll when its peripheral speed of rotation falls below that imparted to it by its positively driven companion roll. The connections which we provide include a clutch so constructed that it will have the requisite strength to drive the friction roll, while, at the same time, its outside dimensions will be small enough to permit it to become a part of the usual roll driving connections. With respect to the outside dimensions of the clutch, it will be understood that, particularly in the case of the smaller diameter rolls used for light material such as strips, the space between the roll driving spindles or shafts is too small to permit the use of a clutch having an outside diameter much larger than that of the usual wabbler sleeve or yoke.

Our improvements in roll-driving connections may be best understood by explaining our preferred form of clutch as illustrated in Figs. 2, 3 and 4 of the drawings. It includes a pair of clutch members 1 and 2 provided with coöperating ratchet teeth arranged in a plane substantially perpendicular to the axis upon which the clutch members rotate. The clutch member 1 preferably consists of a sleeve secured at one end to the end of a frictionally driven roll 3, the other end of the sleeve projecting beyond the end of the roll and provided with ratchet teeth 4.

The clutch member 2 consists also of a sleeve mounted for longitudinal movement upon, but rotatable with, the fluted end of a roll-driving spindle or shaft 6. The interior of the sleeve 2 is provided with inwardly-projecting ribs 30 which, in the assembly of parts, lie in the grooves or flutes of the end portion of the spindle 6, and is provided at its outer end with ratchet teeth 7 which are adapted to engage the teeth 4 of the sleeve 1. The teeth 7 are held yieldingly toward the sleeve 1 by means of a series of springs 8 arranged in the grooves of the spindle 6, as indicated in Figs. 2 and 3. These springs bear at their ends upon the wabbler 9 of the spindle 6 and upon the sleeve 2. They are preferably surrounded by tubes 10, and may be held within the grooves of the spindle portion 5 by means of a strip of metal 11 wrapped around the spindle.

In operation the driving connections are such that the friction roll 3 rotates in the direction indicated by the arrow 12 a greater number of revolutions per minute than does the spindle 6. Accordingly, the clutch member 2 is, by the teeth 4 of the clutch member 1, moved to the left against the resistance of the springs 8. When, however, the rotation of the friction roll 3 tends to lag behind that of the spindle 6, the clutch member 2 is pressed into engagement with the clutch member 1, and the shaft or spindle 6 becomes effective to positively drive the friction roll.

In Fig. 1 there is shown a series of sets of rolls and their driving connections illustrating several uses of the above explained clutch, and also illustrating further improvements in roll-driving connections. Three sets of rolls 13 and 14, 15 and 16, and 17 and 18, are indicated as being arranged end to end, a slow speed motor 19 being provided for positively driving some and a high-speed motor 20 for driving others of the rolls. This particular arrangement of rolls is similar to that shown in Fig. 6 of the H. G. O'Brien Patent No. 1,236,598. In the practice of our invention the number of sets of rolls may be varied, as well as the specific arrangement of spindles, clutches and gears shown herein. In this particular arrangement a slow speed motor 19 drives pinions 21 and 22 which in turn are connected to the rolls 13 and 14. The roll 14 is positively driven, it being directly connected by means of a spindle 23 and collars 24 to the pinion 21, while the roll 13 is normally driven frictionally but is, by means of clutch members 1ª and 2ª, positively driven in case the speed of rotation falls below that of the positively driven roll 14. To the end that the roll 13 may normally be driven frictionally at a greater number of revolutions per minute than the spindle 25, the difference in revolutions per minute of the spindle 25 and the roll 13 may be effected either by constructing the roll 13 of smaller diameter than the roll 14, or, if of the same diameter, by constructing the pinion 22 of larger diameter than the pinion 21.

By means of the connections clearly indicated, the rolls 16 and 17 are positively driven by the high-speed motor 20. In the two sets of rolls of which the rolls 16 and 17 form parts the frictionally driven companion rolls 15 and 18 are arranged one above and the other below its coöperating positively driven roll, and connections are provided to positively drive the friction rolls by means of the slow speed motor in case the friction rolls, or one of them, sticks. For this purpose a spindle 26 and clutch 1ᵇ, 2ᵇ, connects the positively driven roll 14 with the friction roll 15, and a corresponding spindle 27 and clutch 1ᶜ, 2ᶜ, connects the two friction rolls 15, and 18, with each other. Thus in case either the roll 15 or 18 sticks, it will be positively driven by means of the slow speed motor rather than by means of connections extending from the high speed motor, as in the case of the friction roll 13. Accordingly, there is eliminated the gears essential to the driving of the friction rolls by means of the high-speed motor.

By using ratchet teeth clutches having their teeth arranged in a plane substantially perpendicular to the axis of the spindle, the size of the clutch members may be substantially the same as the usual boxes or wabblers used for connecting rolls to spindles, and accordingly such a clutch may be used in the place of such a box, as indicated in several places in Fig. 1. Furthermore such a clutch may have the requisite strength to drive a friction roll, which, when it sticks, requires more than the usual driving torque to start it.

We claim as our invention:

1. In a rolling mill, the combination of a pair of rolls, driving connections for positively driving both of said rolls at different relative peripheral speeds, the driving connections for the lower speed roll including a pair of clutch members each provided with coöperating ratchet teeth arranged in a plane substantially perpendicular to the axis of rotation of the driving connection, the teeth of one of said clutch members being yieldingly movable in a direction parallel to said axis whereby the lower speed roll may normally be driven frictionally by the higher speed roll.

2. In a rolling mill, the combination of a pair of rolls, driving connections for positively driving both of said rolls at different relative peripheral speeds, the driving connections for the lower speed roll including a spindle, a pair of clutch members secured one to said spindle and the other to the end of said lower speed roll, said clutch member being provided with coöperating ratchet teeth arranged in a plane substantially perpendicular to the axis of rotation of said spindle, one of said clutch members being yieldingly movable in a direction parallel to said axis whereby the lower speed roll may normally be driven frictionally by the higher speed roll.

3. In a rolling mill, the combination of a pair of rolls, driving connections for positively driving both of said rolls at different relative speeds, the driving connections of the lower speed roll including a sleeve connected to the end of the lower speed roll, a longitudinally fluted spindle, a sleeve mounted for longitudinal movement upon said spindle, and springs arranged in the flutes of said spindle and yieldingly pressing said second-mentioned sleeve toward said first-mentioned sleeve, the meeting faces of said sleeves being provided with coöperating ratchet teeth whereby the lower speed roll may normally be frictionally driven by the higher speed roll.

4. In a rolling mill the combination of two sets of rolls arranged end to end, a high speed motor for positively driving a roll of one set, a low speed motor for driving a roll of another set, and driving connections extending from said slow speed motor to a companion roll of one of said rolls driven by the high speed motor, said connections including a clutch permitting said companion roll to be normally driven frictionally by its coöperating driven roll but coming into action to positively drive said companion roll when its speed drops to that of said driving connections.

In testimony whereof we have hereunto set our hands.

JOSEPH WITHERS.
HENRY G. O'BRIEN.

Witnesses:
 JOHN W. HUGHES,
 L. A. FARRELL.